United States Patent
Parker et al.

(10) Patent No.: US 7,634,492 B2
(45) Date of Patent: Dec. 15, 2009

(54) AGGREGATE DATA VIEW

(75) Inventors: Charles W. Parker, Sammamish, WA (US); Eray Chou, Seattle, WA (US); Zhenguang Chen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 386 days.

(21) Appl. No.: 11/018,494

(22) Filed: Dec. 20, 2004

(65) Prior Publication Data

US 2006/0136449 A1 Jun. 22, 2006

(51) Int. Cl.
*G06F 17/00* (2006.01)

(52) U.S. Cl. .................. 707/102; 707/100; 707/101; 707/104.1

(58) Field of Classification Search ............ 707/101, 707/104.1, 10, 100, 102
See application file for complete search history.

(56) References Cited

U.S. PATENT DOCUMENTS

| | | | |
|---|---|---|---|
| 7,117,215 B1 * | 10/2006 | Kanchwalla et al. ........ 707/100 |
| 7,363,581 B2 * | 4/2008 | Parks et al. .................. 715/235 |
| 2003/0083978 A1 * | 5/2003 | Brouwer ....................... 705/37 |
| 2003/0144969 A1 * | 7/2003 | Coyne ......................... 705/400 |
| 2003/0204430 A1 * | 10/2003 | Kalmick et al. ................. 705/8 |
| 2005/0015619 A1 * | 1/2005 | Lee .............................. 713/201 |
| 2005/0039033 A1 * | 2/2005 | Meyers et al. ............... 713/193 |
| 2006/0074916 A1 * | 4/2006 | Beary ........................... 707/10 |
| 2006/0117031 A1 * | 6/2006 | Berg et al. ................... 707/100 |
| 2006/0136469 A1 * | 6/2006 | Dettinger et al. ............ 707/102 |
| 2006/0206372 A1 * | 9/2006 | Carpenter et al. ............. 705/10 |

* cited by examiner

*Primary Examiner*—Hung T Vy
*Assistant Examiner*—Angela M Lie
(74) *Attorney, Agent, or Firm*—Merchant & Gould PC (57) ABSTRACT

Methods, systems, and computer-readable media implementing various aspects of data retrieval, transformation, data interrelationship inference, and aggregate data view generation are disclosed. The aggregate data view may incorporate data sources from geographically disparate servers, and in different data formats. The aggregate data view may further be converted into HTML and published on the web.

19 Claims, 5 Drawing Sheets

AGGREGATE DATA VIEW

TECHNICAL FIELD

The present invention relates generally to the field of software applications. More particularly, the present invention relates to software applications that store data and report data.

BACKGROUND OF THE INVENTION

In order to manage large quantities of data, computer software applications, such as spreadsheet and database applications, have been developed to organize and store the data in a logical manner. Typical spreadsheet and database applications comprise a large number of records of information, wherein each record comprises a predetermined number of fields. In the context of a database, a database management system is typically used to provide the software tools to manipulate the database more simply. Example database management systems include Microsoft® Access and Microsoft® SQL Server, among others.

A typical database management system provides the user the ability to add, modify and/or delete data, query data using filters, and report records in the database. Data in databases and spreadsheets is typically represented using rows and columns. A field is an intersection of a row and a column. A column may thus include a plurality of fields. One skilled in the art will appreciate that many other types of data can be kept and displayed in databases and spreadsheets using a table. In general, any given field may only contain a single, scalar data value. Data queries typically take the form of a query language, such as Structured Query Language (SQL). Such queries may be performed on locally held data, or submitted to a database server for execution.

Given the relative power and prevalence of database and spreadsheet applications, many users wish to integrate and view data from different sources. For instance, users may want to combine spreadsheet data with their database data to generate a report. Unfortunately, since data from different sources may be in different formats, integration remains difficult. Generating an integrated report therefore may involve manually generating queries for each disparate data source and/or manually transforming all data into common format. Bringing together data from disparate sources into a common view can be intractable, potentially involving retrieving data from different physical sites in a network, relating subsets of data together, linking fields in subsets to each other, and other tasks which generally require an adept user with intimate knowledge of each data source.

It is with respect to these considerations and others that the present invention has been made.

SUMMARY OF THE INVENTION

In accordance with the present invention, a computer-implemented method and computer-readable medium are provided for generating an aggregate (combined) data view of data from disparate sources. A specification of a plurality of data sources is received. Next, data is retrieved from a plurality of the data sources described by the specification, and transformed into a common format. A view is generated from the common formatted information.

In accordance with other aspects, the present invention relates to a computer-implemented method and computer-readable medium for inferring data source interrelationships. A database selection and data table selection are received. The selected database is scanned for data tables linked via foreign key, and the data tables linked via foreign key are displayed.

In accordance with still other aspects, the present invention relates to a system for generating aggregate data views. The system has an input/output ("I/O") module that receives input and displays output. The system further uses an inference module that generates data source relationship inferences and a retrieval/conversion module for retrieving data from a data source, and transforms the data into a common format. A view generation module is used to generate an aggregate data view, and a publication module publishes the aggregate data view.

The invention may be implemented as a computer process, a computing system or as an article of manufacture such as a computer program product or computer readable media. The computer readable media may be a computer storage media readable by a computer system and encoding a computer program of instructions for executing a computer process. The computer program readable media may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
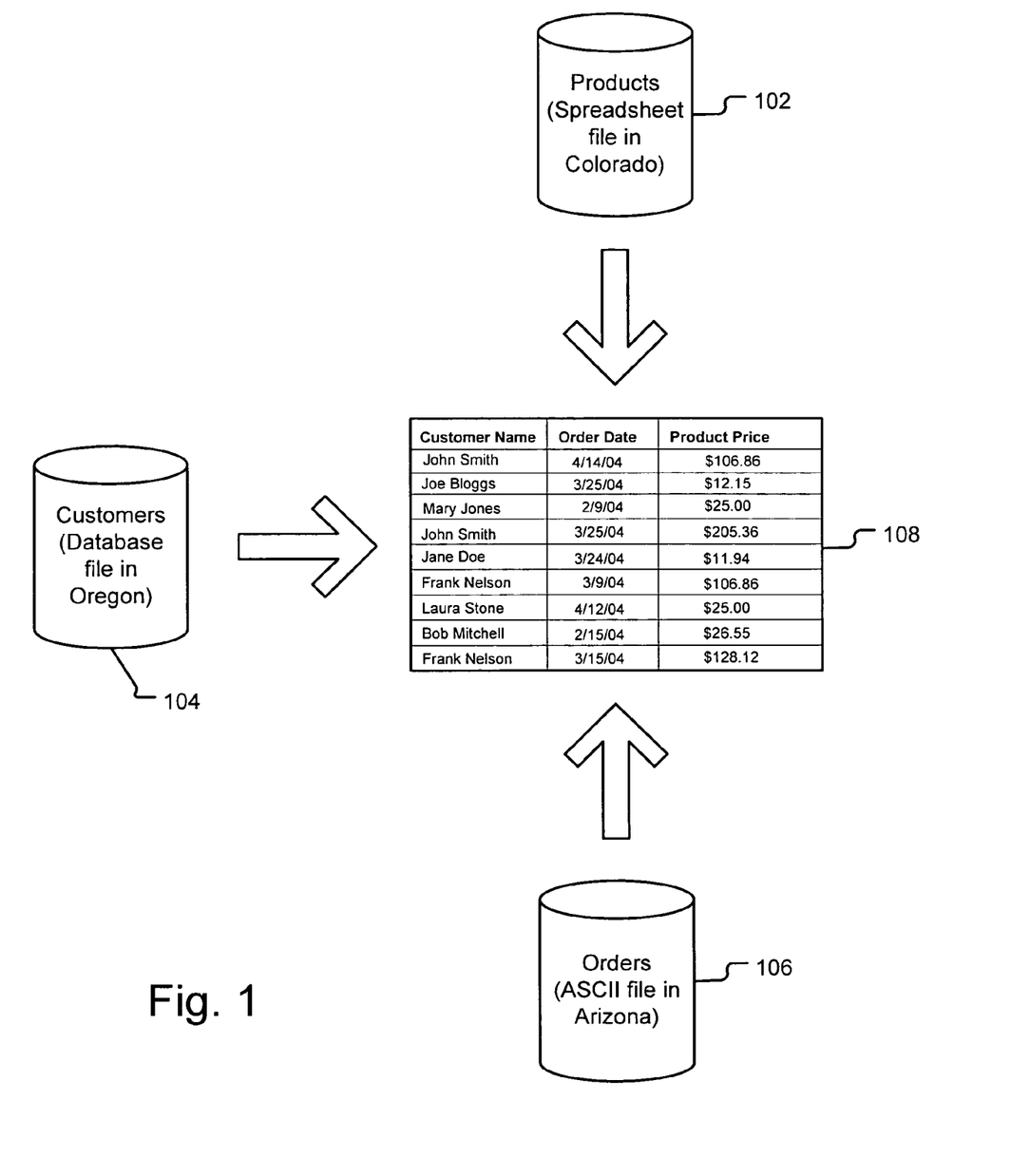
FIG. 1 depicts a plurality of data sources, disparate both in format and location, being combined into an aggregate view in accordance with an embodiment of the present invention.

A plurality of data sources 102, 104 and 106 being combined into an aggregate view 108 according to aspects of the present invention is exemplified in FIG. 1. In this example, data source 102 is a spreadsheet file kept on a data server in a first region, such as Colorado. Data source 102 contains product data, such as item numbers, textual descriptions, and prices. Although not necessary, for the purpose of this example, data source 104 is a database file kept on a data server in a second region, e.g., Oregon. Data source 104 contains customer data, such as customer numbers, names, addresses, and phone numbers. Although not necessary, for the purpose of this example, data source 106 is an ASCII delimited file kept on a data server in a third region, e.g., Arizona. Data source 106 contains order data, such as order numbers, customer numbers, item numbers, and dates. In accordance with an embodiment of the present invention, data sources 102, 104, and 106 are automatically retrieved and transformed into a common format and combined into aggregate data view 108. Aggregate data view 108 thus enables users to access customer, product, and order data all in the same, unified aggregate data view. Aggregate data view 108 incorporates data in numerous formats from different physical network locations into a seamless display that includes customer names, order dates, and product prices.

Figure 2:
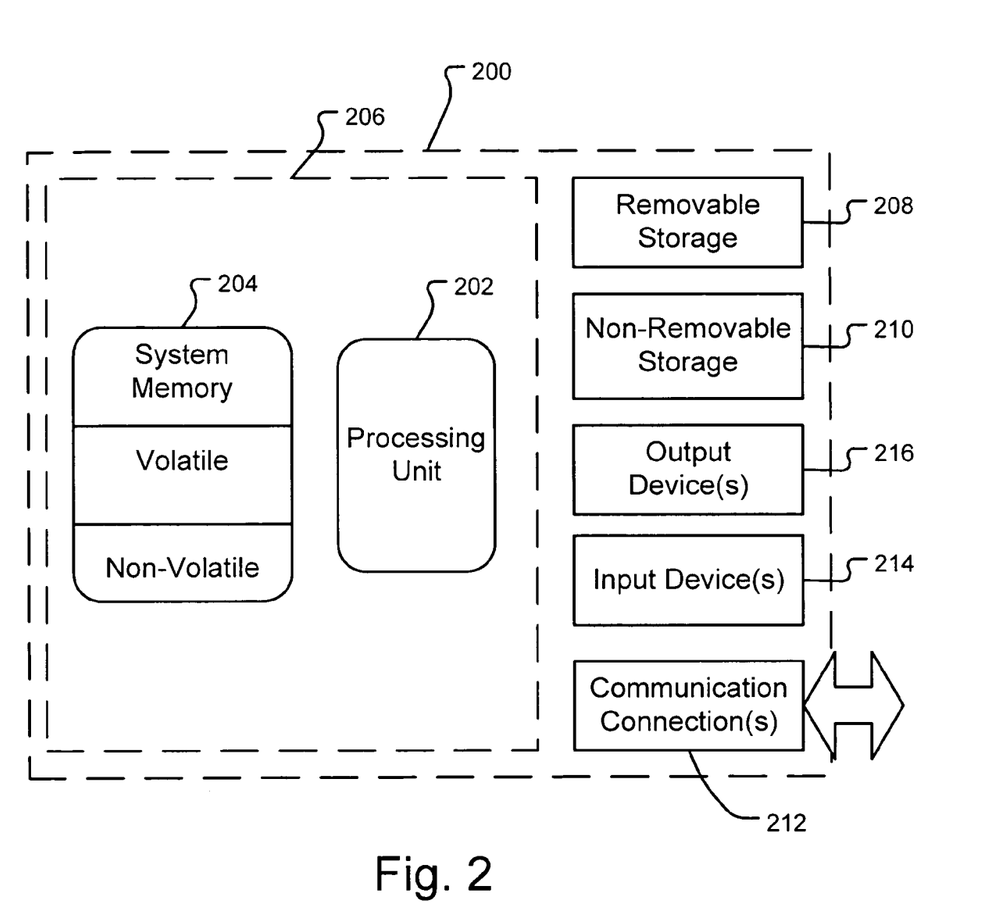
FIG. 2 illustrates an example of a suitable computing system environment on which an embodiment of the present invention may be implemented.

Given that the present invention may be implemented as a computer system, FIG. 2 is provided to illustrate an example of a suitable computing system environment on which embodiments of the invention may be implemented. In its most basic configuration, system 200 includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206.

In addition to the memory 204, the system may include at least one other form of computer-readable media. Computer-readable media can be any available media that can be accessed by the system 200. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Memory 204, removable storage 208, and non-removable storage 210 are all examples of computer storage media. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

System 200 may also contain a communications connection(s) 212 that allow the system to communicate with other devices. The communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In accordance with an embodiment, the system 200 includes peripheral devices, such as input device(s) 214 and/or output device(s) 216. Exemplary input devices 214 include, without limitation, keyboards, computer mice, pens, or styluses, voice input devices, tactile input devices and the like. Exemplary output device(s) 216 include, without limitation, devices such as displays, speakers, and printers. For the purposes of this invention, the display is a primary output device. Each of these devices is well know in the art and, therefore, not described in detail herein.

With the computing environment in mind, the following figures are described with reference to logical operations being performed to implement processes embodying various embodiments of the present invention. These logical operations are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 3:
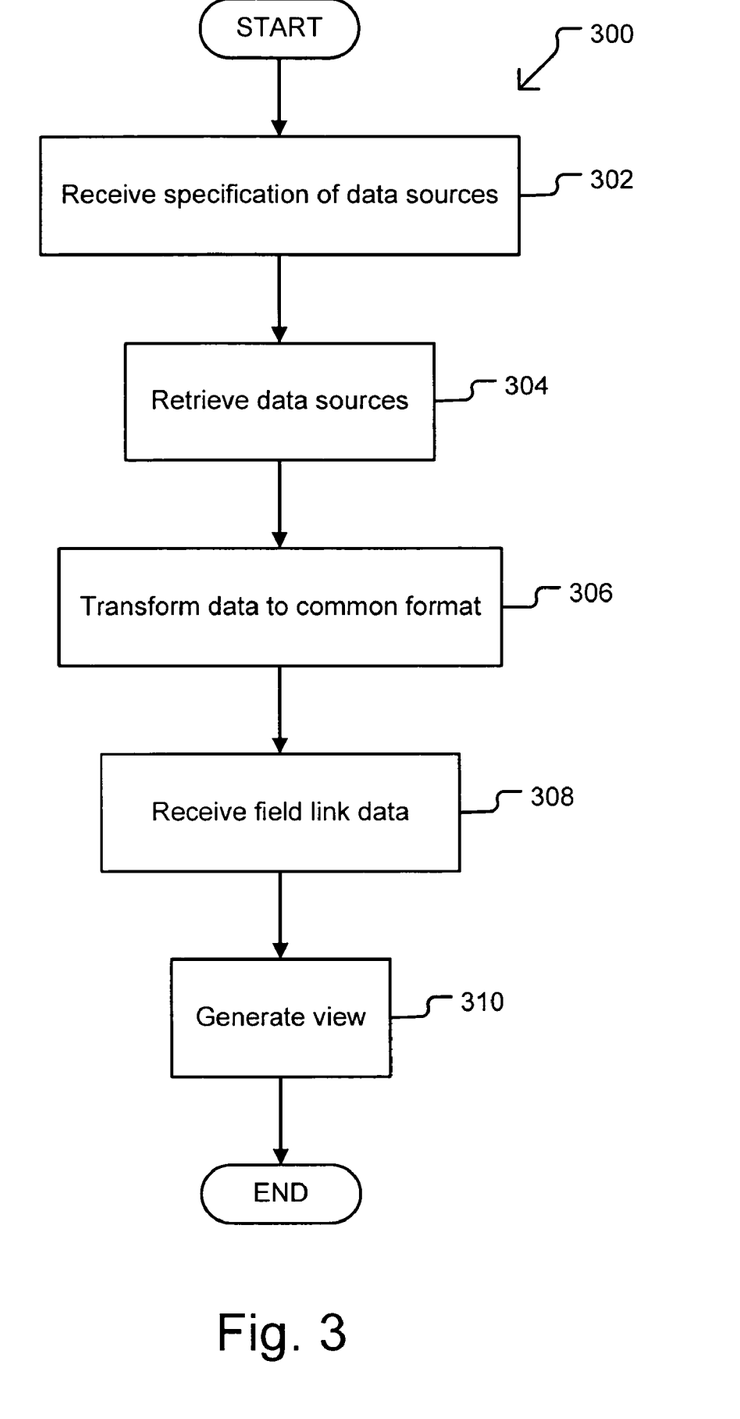
FIG. 3 illustrates the operational flow of the operations performed in accordance with an embodiment of the present invention.

FIG. 3 illustrates the operational flow 300 of operations performed in accordance with an embodiment of the present invention, in which data is aggregated and published. In a typical environment, a user understands what data sources need to be aggregated, and passes a specification of these data sources to receive operation 302. Receive operation 302 receives a specification of data sources to be aggregated. These specifications may be in the form of data server and data file names, uniform resource locators (URLs), or any other method of addressing a network resource known in the art. In one embodiment, a data source comprises a file on a disk drive or data server. Alternatively, a data source may comprise one or more records within a file, such that an index or address to the record may be included in a data source specification. The specification may be received from a computer, or from a user. In an embodiment, a user formulates the data source specifications using a provided menu of data sources (discussed below, in conjunction with FIG. 5).

Following receive operation 302, retrieve operation 304 retrieves the specified data sources. The data sources may be local or remote, such that the sources may be retrieved by File Transfer Protocol (FTP), by Secure File Transfer Protocol (SFTP), by copying files from a mapped network drive, or via other file transfer technique or combination of techniques. In an embodiment where a data source comprises one or more tables or records within a specific file or other data structure, retrieve operation 304 opens the file, looks up the one or more records or tables, and accesses the one or more records or tables.

Next, transform operation 306 transforms the data into a common format. In one embodiment, the common format is Extensible Markup Language (XML). XML is text-based, and features customized tags that offer greater flexibility in organizing and presenting information than is possible with many other document coding systems such as Hypertext Markup Language (HTML). As a result, XML is well suited as a common format both because of the flexibility of customized tags and ease of manipulation and concatenation of text. Transform operation 306 may transform data in a variety of ways. In one embodiment, XSLT (Extensible Stylesheet Language Transformations), a language used in transforming data, is employed by transform operation 306 to efficiently perform translations. In one embodiment, transform operation may input code or a file containing code in one format to XSLT, which returns output code or a file containing output code in a specified common format. In an embodiment, transform operation 306 parses through the data source and, using predetermined associations, maps each field to a new field in XML format in the new common format document.

A user may specify relationships between fields by supplying data to receive operation 308. In one embodiment, such a specification may be performed graphically (e.g., by selecting two fields on the screen). In another embodiment, such a specification may be entered textually (e.g., by specifying a table and a field using SQL, or other form of data source and field reference known in the art). Receive operation 308 receives field relationship specification data. The field data is used to equate fields in different data sources to one another. For example, a user may want to aggregate several music album data sources into a single view of music albums. In one data source, the performer name may appear in a field called "Band." In another data source, similar information, e.g., the performer name may appear in a field called "Artist." Field link data received by receive operation 308 is used to equate such fields with differing names, but the same type of content. Field link data received by receive operation 308 may therefore be used by generate operation 310 to shape the aggregate view. In one embodiment, receive operation 308 receives data specifying a relation between two or more fields. In another embodiment, the user is prompted with suggestions for relations when substantially identical field headings are detected.

Generate operation 310 generates an aggregate view using data retrieved from the various data sources by retrieve operation 304, and using field link data received by receive operation 308. In one embodiment, the view is generated in HTML format. In an alternate embodiment, a spreadsheet is generated by generate operation 310. In another embodiment, a database table is generated by generate operation 310. Other formats may also be used for an aggregate view. Generate operation 310 populates the aggregate data view with data from the individual data sources retrieved by retrieve operation 304. In one embodiment, an aggregate view takes the form of an electronic document, and generate operation 310 creates this document and populates it with aggregate view data.

In one embodiment, generate operation 310 may also publish the aggregate view. This may include copying an HTML view to a web-accessible location for widespread accessibility, copying a spreadsheet or data table file to a predetermined or dynamically selected location, or emailing the resulting view to a particular user or group of users.

One skilled in the art will appreciate that the embodiments discussed in conjunction with FIG. 3 are exemplary in nature, and other embodiments are contemplated. For example, receive operations 302 and 308 could take place at several different points in the operational flow without departing from the scope of the claimed invention. Likewise, field link data could be received prior to transform operation 306 instead of after it. Other permutations are also possible. For example, retrieve operation 304 could take place several times, once for each data source than must be retrieved. Additional data sources could also be retrieved after generate view operation 310 based on refinements to the aggregate view.

In a particular embodiment, there may be multiple ways in which multiple data sources may be aggregated. SQL may be used by generate operation 310 to query data in a common format. Data sources combined using SQL may be combined via a JOIN (which combines two or more tables together), via a UNION (which combines the results of two or more SQL queries together), or via a combination of the two. Receive operation 302 and/or receive operation 306 may thus additionally receive data from a user regarding which data combination method to use when combining data sources.

In one embodiment, an additional determine operation (not pictured) may occur which determines whether an improper subview will occur within an aggregate view. An improper subview occurs when two indirectly related tables are present in a view, but the table that relates them is not present. For example, a genealogy aggregate view that includes two tables representing two sets of cousins, but lacks a table representing a common grandparent, includes two indirectly related tables without a visible table that relates them. As such, the described genealogy aggregate view would constitute an improper subview. In an embodiment, the additional determine operation (not pictured), upon detecting an improper subview, prompts a user to define the non-visible relationship. Generate operation 310 may then shape data more precisely according to the defined relationship.

Figure 4:
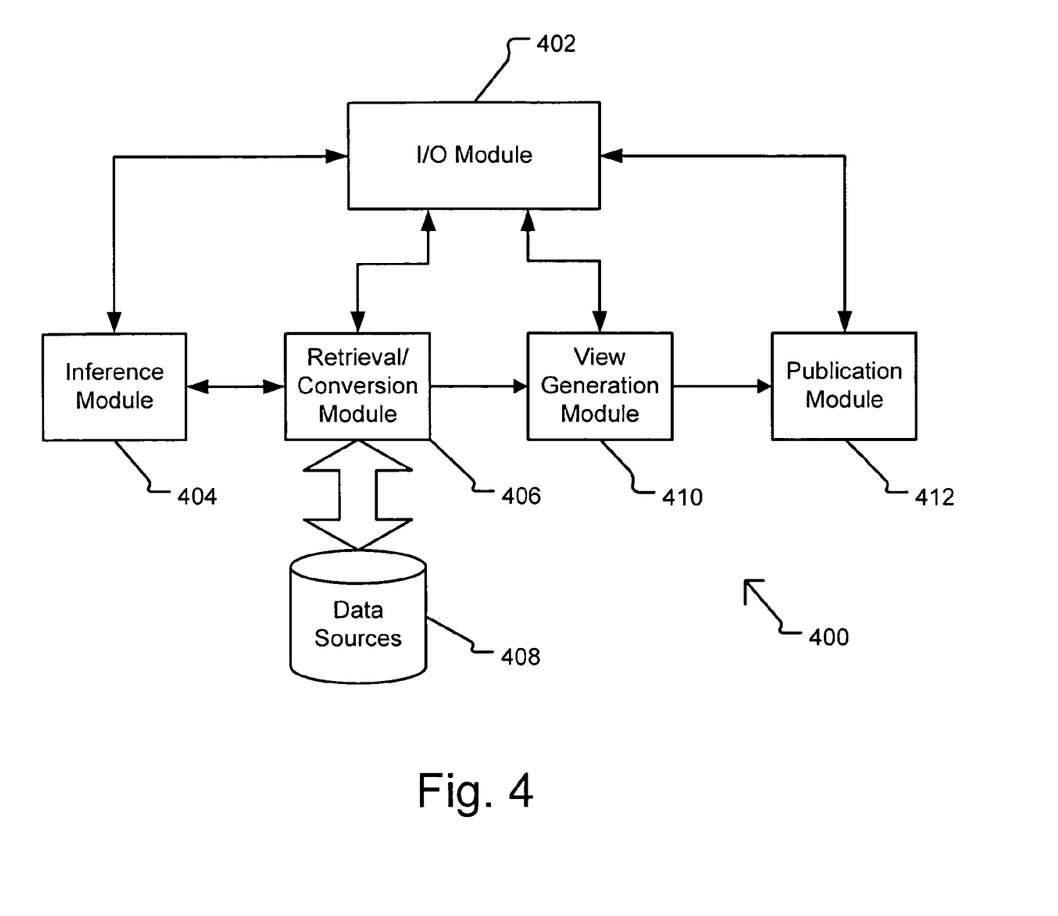
FIG. 4 illustrates modules in accordance with one embodiment of the present invention.

FIG. 4 illustrates various modules in accordance with one embodiment of the present invention. The system 400, shown in FIG. 4, is used to retrieve or receive data from various data sources, potentially in different formats, identify, organize, and aggregate the data, and create a common aggregate view of the data. In order to accomplish this, system 400 has an input/output ("I/O") module 402 that receives input from one or more users, one or more automated computer agents, or a combination thereof, and displays, logs, and/or stores resulting operation feedback and aggregated view data. I/O module 402 sends a data source selection to inference module 404, and receives one or more data source inferences from inference module 404. I/O module 402 also sends one or more data source selections to retrieval module 406, and may receive feedback from retrieval and conversion operations from retrieval module 406. Additionally, I/O module 402 may send view refinement data to view generation module 410, and receives view data from view generation module 410 for display. Further, I/O module 402 may send publication parameters to publication module 412, and may receive publication results from publication module 412. Using the connections between I/O module 402 and modules 404, 406, 410, and 412, control instructions to, and feedback from, each of operations 404, 406, 410, and 412 may be transmitted.

Inference module 404 generates data source inferences given a data source specification. Inference module 404 receives one or more data source selections from I/O module 402, issues a request to retrieval module 406 to retrieve and transform the data sources, and scans the data sources to generate inferences. Inferences are deductions or estimations about the relationships between data sources. One exemplary embodiment in which inferences are generated using a foreign key lookup of data tables is discussed below, in conjunction with FIG. 5. Inferences generated by inference module 404 may be sent back to I/O module 402 for presentation to users. Inference module 404 sends data source selections to retrieval module 406 for retrieval and transformation. Likewise, inference module 404 receives retrieved and transformed data from retrieval module 406.

Retrieval module 406 retrieves and transforms data from data sources. Retrieval module 406 receives one or more data source selections from I/O module 402, and retrieves the selected data sources 408. Although shown as a single source in FIG. 4, data source 408 relates to a plurality of sources, potentially in different formats and potentially in different physical regions, as discussed above in conjunction with FIG. 1. The data sources may be retrieved by File Transfer Protocol (FTP), Secure File Transfer Protocol (SFTP), copying files from a mapped network drive, or other file transfer technique or combination of techniques. In an embodiment where a data source comprises one or more records within a file, retrieval module 406 opens the file and accesses the one or more records. Retrieval module 406 may also transform the data into a common format. In one embodiment, the common format is Extensible Markup Language (XML). If a data source is already in a common format, transformation is not necessary. Data from, and results of, data retrieval and transformation may be transmitted back to I/O module 402.

Retrieval module 406 may also receive one or more data selections provided by inference module 404. Retrieval module 406 will then retrieve and, if necessary, transform the data to a common format, and return any retrieved data to inference module 404.

View generation module 410 generates an aggregate view. View generation module 410 receives retrieved and converted data from retrieval module 404 and combines this data into an aggregate view (discussed above, in conjunction with FIG. 3). View generation module 410 may also send aggregate view data to I/O module 402 for additional user refinement, and may likewise receive refinements to an aggregate view from I/O module 402. In one embodiment, a refinement to an aggregate view may be the resolution of an improper subview detected by view generation module 410. If publication is desired, aggregate view data may be sent to publication module 412 for publishing.

In an embodiment, view generation module 410 may receive shaping directives from a user via I/O module 402. While view generation module 410 makes logical choices with regard to shaping the resulting aggregate data view in terms of both hierarchical data source relationships and data arrangement, users may still desire further refinement or "reshaping." View generation module 410 may thus allow for further adjustment of an aggregate data view by a user prior to publication by publication module 412.

Publication module 412 publishes an aggregate data view. Publication may include copying an HTML view to a web-accessible location for wider availability, copying a spreadsheet or data table file to a predetermined or dynamically selected location, emailing the resulting view to a particular user or group of users, or other method of providing access to an electronic document. Publication 412 may receive publication parameters from a user via I/O module 402. Results of publication (e.g., whether publication was successful) may likewise be sent to I/O module 402 for display.

Figure 5:
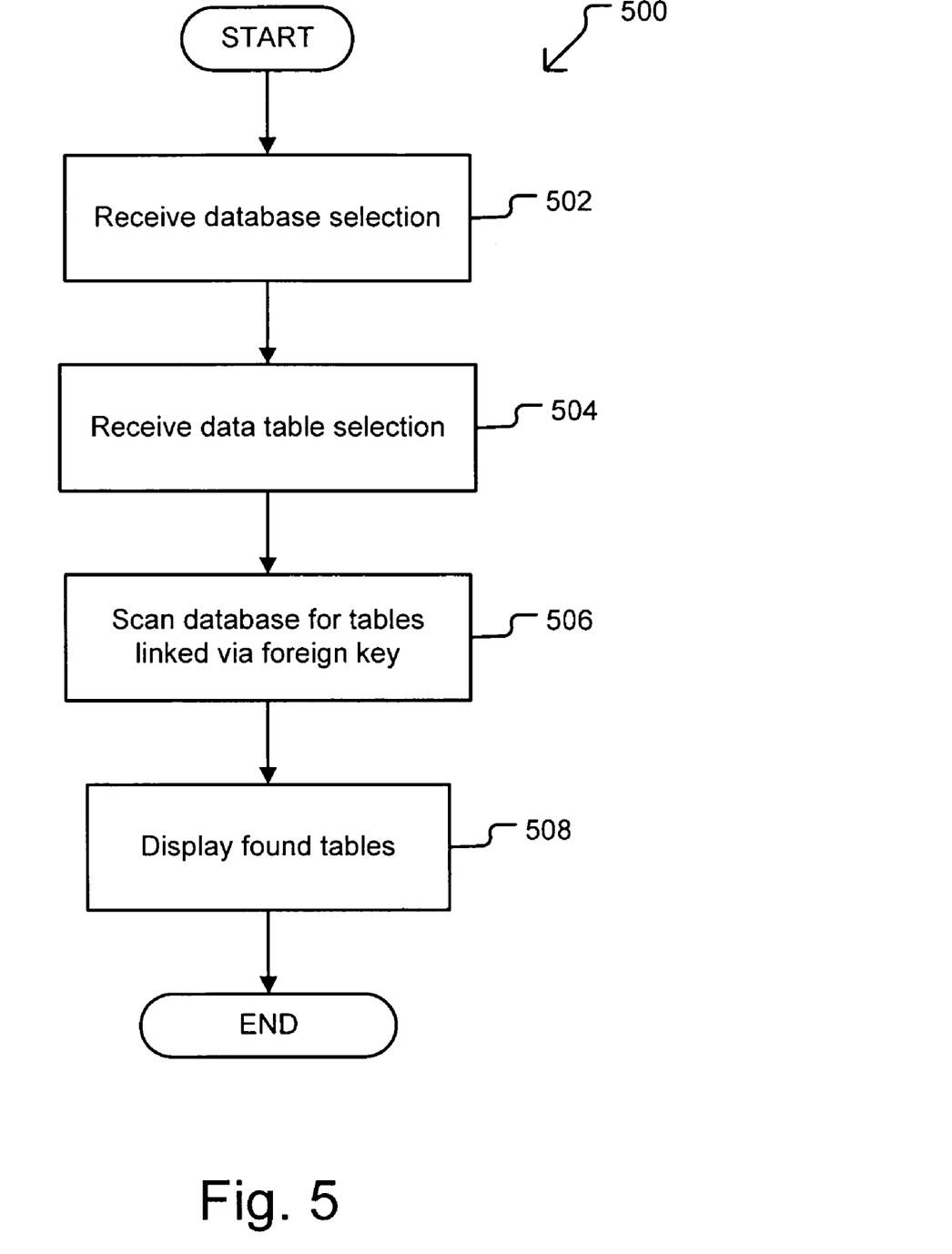
FIG. 5 illustrates the operational flow of the operations performed in accordance with an embodiment of the present invention.

FIG. 5 illustrates the operational flow 500 of the operations performed in accordance with an embodiment of the present invention. Flow 500 relates to providing inferences to a user to assist with data source specification. More particularly, flow 500 relates to an embodiment that provides a user with help in defining a specification or multiple specifications. These specifications are then received by flow 300 during receive operation 302, discussed above in conjunction with FIG. 3. Initially, receive operation 502 receives a database selection from a user, while receive operation 504 receives a data table selection from a user. The selections in receive operations 502 and 504 may be in the form of a file name, file path, uniform resource identifier (URI), or other method of database specification. Receive operations 502 and 504 may be performed in any order, or may be combined into a single operation in which both database and data table selection are received simultaneously.

Upon receipt, scan operation 506 scans the received database for data tables linked via foreign key to the selected data table. A foreign key is a key in one data table that maps to a key in another data table. More specifically, where multiple tables exist, a present table and at least one other table, a foreign key is a key in another table that refers to a specific key in the present table. Such a mapping can be useful in that it suggests a concrete relationship between two data tables. Foreign keys thus represent one useful source of inferences that can be made about data sources. Scan operation 506 uses one or more detected foreign keys to generate inferences, which are displayed by display operation 508.

Display operation 508 displays any data tables found to be linked via foreign key to the selected data table (and thus, inferred to be related to the selected data table) by scan operation 506. Display operation 508 also allows users to select the inferred data tables. In one embodiment, inferred data tables are presented with checkbox controls next to each, although any form of providing suggestions and receiving selections may just as readily be used. By selecting a checkbox corresponding to an inferred data table, the data table will be sent to receive operation 302 (FIG. 3).

After display operation 508, flow proceeds to receive operation 302 (FIG. 3).

One skilled in the art will appreciate that while the existence of foreign keys was used to generate inferences about data sources in the exemplary embodiment discussed above, other methods of data relationship inference known in the art could be used in conjunction with scan operation 506 without departing from the scope of the claimed invention. For example, some tables may have associated meta data identifying other tables that may be used to generate inferences about data source interrelationships.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A system for generating aggregate data views comprising:
    at least one processor;
    a memory containing instructions executable by the at least one processor, the instructions comprising:
        an I/O module for receiving input and displaying output, wherein a specification selected by a user is received in said I/O module, wherein said specification comprises data to be retrieved from a plurality of data sources, and wherein said data is stored in a plurality of computer language formats and the data includes field link data;
        an inference module for generating data source relationship inferences by screening a plurality of data sources in said specification for one or more foreign keys, wherein said data source relationship inferences based upon said one or more foreign keys are displayed via said I/O module to allow selection of at least one of said data source relationship inferences;
        a retrieval/conversion module for automatically retrieving said data from said plurality of data sources, and automatically transforming said data from a plurality of computer language formats to a common format;
        a view generation module for generating an aggregate data view based upon said data from said plurality of data sources, and said at least one of said data source relationship inferences selected, and the field link data, wherein the field link data is used to equate fields from different data sources having different names but a same type of content; and
        a publication module for publishing the aggregate data view.

2. A system as defined in claim 1, wherein said view generation module detects improper subviews.

3. A system as defined in claim 2, wherein said view generation module rectifies said improper subviews.

4. A system as defined in claim 1, wherein said view generation module allows reshaping of said data by said user.

5. A system as defined in claim 1, wherein said retrieval/conversion module performs said automatically transforming said data to a common format using XSLT.

6. A system as defined in claim 1, wherein said I/O module sends said data from said plurality of data sources to said inference module, and said I/O module receives said data source relationship inferences from said inference module.

7. A system as defined in claim 1, wherein said data source relationship inferences generated by said inference module are sent to said I/O module for presentation to said user.

8. A system as defined in claim 1, wherein when a one of said plurality of data sources comprises one or more records within a file, said retrieval/conversion module opens said file and accesses said one or more records.

9. A system as defined in claim 1, wherein said publication module publishes the aggregate data view to at least a one of a web-accessible location, a predetermined or dynamically selected location, and to a particular user or group of users via an email.

10. A computer storage medium accessible to a computing system and encoding a computer program for generating an aggregate data view comprising:
   receiving a specification selected by a user, wherein said specification comprises data to be retrieved from a plurality of data sources, wherein said data from said plurality of data sources are gathered from different physical network locations, and wherein said data is stored in a plurality of computer language formats;
   automatically retrieving said data from said plurality of data sources;
   generating a data source relationship inferences based upon said specification through screening said plurality of data sources for one or more foreign keys;
   displaying said data source relationship inferences;
   selecting at least one of said data source relationship inferences;
   automatically transforming said data retrieved from the plurality of computer language formats into a common format;
   receiving a field link data for equating fields with different names but a same type of content, wherein fields equated by the field link data are from different data sources;
   generating the aggregate data view based upon said plurality of data sources and said selected data source relationship inferences, and said field link data; and
   displaying the aggregate data view.

11. A computer storage medium as defined in claim 10, further comprising publishing the aggregate data view.

12. A computer storage medium as defined in claim 10, wherein said automatically transforming the retrieved data is performed using XSLT.

13. A computer storage medium defined in claim 10, further comprising detecting an improper subview.

14. A computer storage medium as defined in claim 13, further comprising rectifying said improper subviews.

15. A computer storage medium as defined in claim 10, wherein said generating step further comprises:
   scanning said plurality of data sources for meta data for said data source relationship inferences.

16. A computer storage medium as defined in claim 10, further comprising:
   when a one of said plurality of data sources comprises one or more tables or records within a specific file, opening said specific file and accessing said one or more tables or records.

17. A computer storage medium as defined in claim 10, wherein said common format is Extensible Markup Language (XML).

18. A computer storage medium as defined in claim 11, wherein said publishing step further comprises:
   publishing the aggregate data view to at least one of a web-accessible location, a predetermined or dynamically selected location, and to a particular user or group of users via an email.

19. A method for generating an aggregate data view comprising:
   receiving a specification selected by a user on a computing device, wherein said specification comprises data to be retrieved from a plurality of data sources, wherein said data from said plurality of data sources are gathered from different physical network locations, and wherein said data is stored in a plurality of computer language formats;
   automatically retrieving said data from said plurality of data sources on a data storage device;
   generating data source relationship inferences based upon said specification through screening said plurality of data sources for one or more foreign keys;
   displaying said data source relationship inferences;
   selecting at least one of said data source relationship inference at the computing device;
   automatically transforming said data retrieved from the plurality of computer language formats into a common format;
   receiving a field link data for equating fields with different names but a same type of content, wherein fields equated by the field link data are from different data sources on different data storage devices;
   generating the aggregate data view based upon said plurality of data sources and said selected data source relationship inferences, and said field link data; and
   displaying the aggregate data view on the computing device.

* * * * *